United States Patent [19]
Orimo et al.

[11] Patent Number: 5,630,135
[45] Date of Patent: May 13, 1997

[54] MULTIPLE-EXECUTION METHOD OF MULTIPLE-VERSION PROGRAMS AND COMPUTER SYSTEM THEREFOR

[75] Inventors: Masayuki Orimo, Kawasaki; Kinji Mori, Machida; Katsumi Kawano, Kawasaki; Shigeki Hirasawa, Sagamihara; Hiroshi Fujise, Yokohama; Hitoshi Suzuki, Owariasahi; Tomoaki Nakamura, Katsuta, all of Japan

[73] Assignee: Hitachi, Ltd., Tokyo, Japan

[21] Appl. No.: 253,482

[22] Filed: Jun. 3, 1994

[51] Int. Cl.$^6$ ................................................. G06F 13/00
[52] U.S. Cl. .......................... 395/676; 395/706; 395/680
[58] Field of Search .................................. 395/650, 700, 395/200, 800; 364/200, 300

[56] References Cited

U.S. PATENT DOCUMENTS

| | | | |
|---|---|---|---|
| 4,323,966 | 4/1982 | Whiteside et al. | 364/200 |
| 4,558,413 | 12/1985 | Schmidt et al. | 364/300 |
| 4,956,772 | 9/1990 | Neches | 364/200 |
| 5,113,523 | 5/1992 | Colley et al. | 395/800 |
| 5,410,651 | 4/1995 | Sekizawa et al. | 395/200 |

FOREIGN PATENT DOCUMENTS

WO9100200  10/1991  WIPO .

OTHER PUBLICATIONS

"Shape–aSoftware Configuration Management Tool", Axel Mahler, Intl. Workshop on Software Version and Configuration Control, Sep. 1987.
IEEE Transactions on Computers, vol. 38, No. 5, 1989, pp. 626–636.
IEEE Computer, vol. 17, No. 8, 1984, pp. 67–80.

*Primary Examiner*—Kevin A. Kriess
*Assistant Examiner*—Majid A. Banankhah
*Attorney, Agent, or Firm*—Antonelli, Terry, Stout & Kraus, LLP

[57] ABSTRACT

A method for executing programs in a distributed processing system includes executing in a plurality of first processors different programs which perform the same function. Messages, containing data representing execution result output from said different programs and attribute information indicating function to be performed by the different programs, are transmitted from the first processors to a network. A second processor then receives these messages and selects a message therefrom based on an analysis of the attribute information contained in all of the received messages. The second processor then executes an application program using the data contained in the selected message. Alternatively, the message-selecting step is made based on both the attribute information and data contained in the messages received in the second processor. Each of the messages from the first processors may include graphic image data which can be analyzed and shown on a display.

11 Claims, 5 Drawing Sheets

MULTIPLE-EXECUTION METHOD OF MULTIPLE-VERSION PROGRAMS AND COMPUTER SYSTEM THEREFOR

BACKGROUND OF THE INVENTION

The present invention relates to a method for executing multiple programs in a distributed processing system having a plurality of processors connected through a network, and more particularly to a multiple-execution method of multiple-version programs and a computer system therefor. Further executed means particularly, the present invention relates to a multiple-execution method of multiple-version programs, and a computer system for implementing the same, which can reduce a burden on a user, maintain the independence between the programs, and effectively utilize an execution result which is not finally selected.

In the present specification, the term of "multiple-version programs" means a plurality of programs for performing the same function but having different program structures. The execution results of the programs may be either the same or not the same. For example, a simulation program for an event having a low calculation precision and a short calculation time and a simulation program for the same event having a high calculation precision and a long calculation time are multiple-version programs.

In a system having a plurality of processors connected through a transmission line, DRB system and N version systems have been known as multiple-execution methods of multiple-version programs.

In the DRB system, as disclosed in IEEE Transactions on Computers, Vol. 38, No. 5, 1989, pp 626–636, the multiple-version programs are prioritized and an execution result of the first priority version program is tested by a predetermined test logic called an acceptance test, and if the test result is correct, it is selected. If the test result is incorrect, an execution result of the second priority version program is selected.

On the other hand, in the N version system, as disclosed in IEEE Computer, Vol. 17, No. 8, 1984, pp 67–80, the multiple-version programs are executed in parallel by a plurality of processors and execution results of the respective programs are compared by a processor for checking an output and one execution result is selected based on a majority logic. In the DRB system, since the user must prepare the acceptance test and the preparation of the acceptance test is not easy, the burden to the user is large. On the other hand, in the N version system, since the output results of the respective programs are simply compared, it is required that the outputs are identical for the multiple-version programs. As a result, the independency among the programs is low and it is difficult to prepare the multiple-version programs. The minority execution result through the majority logic is simply thrown away and it is not effectively utilized.

SUMMARY OF THE INVENTION

It is an object of the present invention to provide a multiple-execution method of multiple-version programs which can reduce the burden to the user, maintain independency among the programs, and effectively utilize an execution result which is not finally outputted.

It is another object of the present invention to provide a computer system for suitably implementing the multiple-execution method of the multiple-version programs of the present invention.

In order to achieve the above objects, in accordance with a first aspect of the present invention, in a distributed processing system having a plurality of processors connected through a network, at least two first processors execute multiple-version programs which perform the same function, and messages which contain data output as execution results of the programs and attribute information indicating the versions of the executed programs are sent from the first processors to the network. The messages containing the results of processing by the multiple-version programs sent from the first processors are received by a second processor, which selects one message from the received messages based on the attribute information contained in the received messages and executes a program in the second processor by using the data contained in the selected message. In one embodiment of the present invention, the second processor selects those messages sent from the first processors which were received in a predetermined permissible time period, as candidates for selection. Of the candidate messages, the message sent by the program having the highest priority version is determined to select one message. The multiple-version programs executed by the first processors may include programs having different calculation precision or programs having different developed time frames.

In accordance with a second aspect of the present invention, in a distributed processing system having a plurality of processors connected through a network, at least two first processors execute multiple-version programs which perform the same function, and messages which contain data output as execution results of the programs and attribute information indicating the versions of the executed programs are sent from the first processors to the network. The messages containing the results of processing by the multiple-version programs sent from the first processors are received by a second processor, which selects one message from the received messages based on the attribute information contained in the received messages and executes a program in the second processor by using the data contained in the selected message. In the present program execution method, more preferably, the second processor recognizes the priority of the programs which sent the messages based on the attribute information and based on the recognized priorities, it determines the validity among the data contained in the messages whose priorities are in a predetermined relation. Of the messages containing the data determined as valid data, the message sent from the program having the highest priority is selected.

In accordance with a third aspect of the present invention, there is provided a computer system comprising: a transmission line for transmitting messages; a plurality of first processors, connected to the transmission line, for executing multiple-version programs which perform the same function; and a second processor, connected to the transmission line, for executing a program which utilizes the data contained in the messages sent from the first processors. More specifically, each of the first processors includes program execution means for executing a program, message preparation means for preparing a message containing data derived from the execution of the program by the execution means and attribute information indicating the version of the program executed by the execution means, and an interface for sending out the prepared message to the transmission line. The second processor includes an interface for reading the message from the transmission line, message decode means for extracting the data and the attribute information from the message read by the interface, selection means for selecting the data contained in one message from the messages sent from the first processors based on the extracted attribute information, and program execution means for executing the program by using the data selected by the selection means.

In accordance with the program execution method and the computer system of the present invention, the attribute information contained in the messages sent from the first processors which execute the multiple-version programs is referred so that the second processor utilizing the message can recognize the version of the program of the source of the message. Thus, the second processor can effectively utilize the message depending on the version of the program which generated the received message, or the version of the program and the content of the message.

DESCRIPTION OF THE PREFERRED EMBODIMENTS

Figure 1:
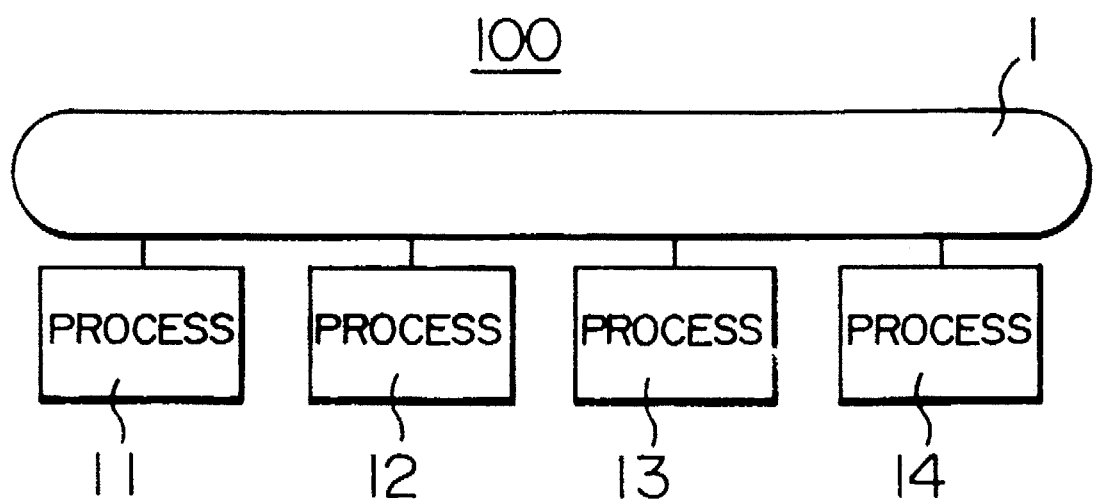
FIG. 1 is a block diagram showing a first embodiment of the computer system in accordance with the present invention to which a multiple-execution method of multiple-version programs is applied.

FIG. 1 shows an overall configuration of an embodiment of a multiple-execution system for multiple-version programs, including a computer system for performing a first embodiment of the multiple-execution method of multiple-version programs of the present invention.

As shown therein, multiple-execution system 100 for the multiple-version programs comprises processors 11, 12, 13 and 14 connected to any type of network. Each of the processors 11, 12, 13 and 14 stores an application program in an associated internal memory and executes the application program to conduct various processings. Each application program has a name assigned to correspond to a function and attribute, including version information and is managed thereby. Where the multiple-version programs performing the same function are not present, the attribute thereof is "Null".

Figure 2:
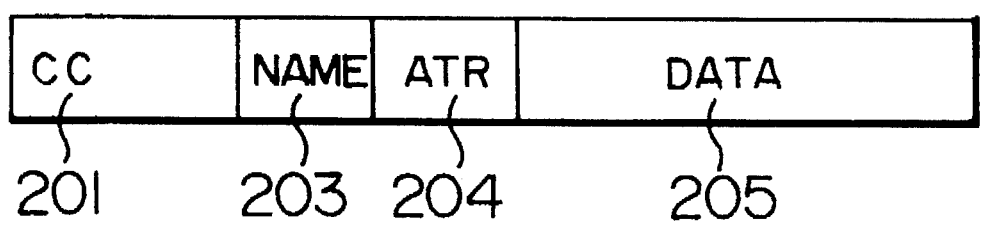
FIG. 2 is a diagram showing a format of a message sent over a network connected to the computer system of the present invention.

FIG. 2 is a diagram of a main part of a format of a message flowing over the network 1.

Data transmitted among the processors by the message is stored in a data field 205. A CC field 201 stores a content code indicating the content of the data stored in the data field 205. The processors 11–14 connected to the network determine whether to read in the message flowing over the network 1 or not based on the content code of the CC field 201. The determination process will be described in detail later.

A name field 203 stores information for identifying an application program generated by the message. In the present embodiment, a name of the application program is used as the information to be stored in the name field 203. An ATR field 204 stores an attribute of the application program generated by the message. The message flowing over the network further includes various control codes for transmitting the message but they are not explained herein because they are not directly related to the present invention.

Figure 3:
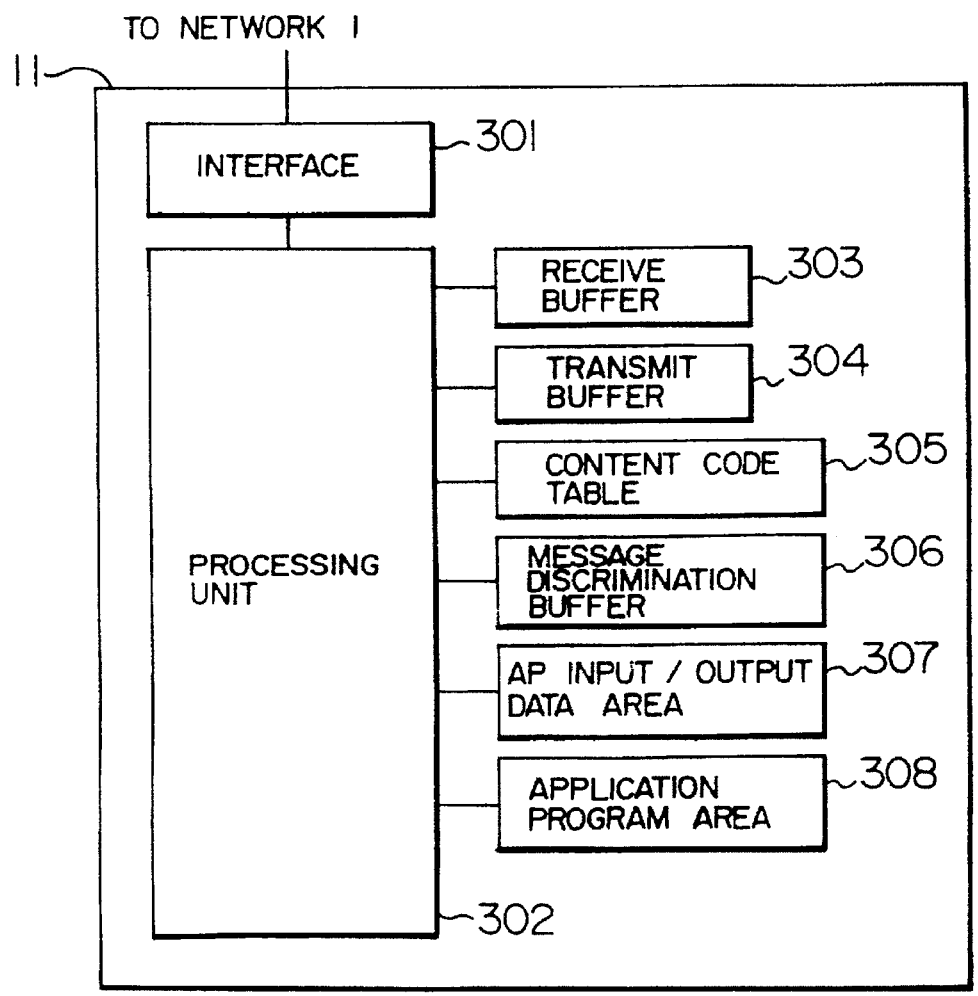
FIG. 3 is a block diagram showing of a configuration of a processor in accordance with the present invention.

FIG. 3 shows a block diagram of an internal configuration of the processor 11. It is identical for other processors 12, 13 and 14.

An interface 301 is a unit which controls the transfer of the message to and from the network. A processing unit 302 controls the processor by using various buffers, tables and areas to be described later.

A receive buffer 303 stores the message received from the network 1. The message received by the interface 301 is temporarily stored in the receive buffer 303 by the processing unit 302. A transmit buffer 304 stores the message to be transmitted to the network 1. The message to be transmitted is temporarily stored in the transmit buffer 304, and then transmitted to the network 1 by the interface 301. A content code table 305 stores the content code corresponding to the data required by the processor 11. The content code to be stored in the content code table 305 is stored in a writable, non-volatile external storage medium such as a disk storage, not shown, and it is read from the external storage medium at the rise of the processor and set in the content code table 305. A message discrimination buffer 306 holds the received message for message discrimination process. An AP input/output data area 307 stores input data necessary for executing the application program and output data of an execution result of the application program. An application program area 308 is used to execute the application program.

Figure 4:
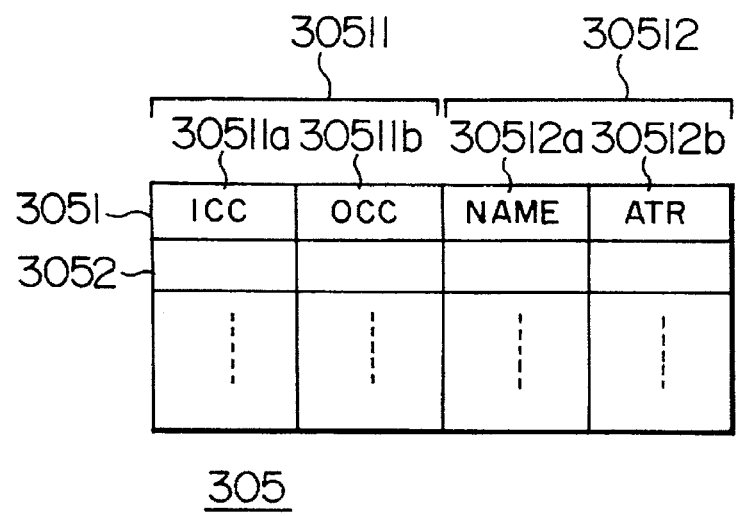
FIG. 4 is a diagram which shows a format of a content code table in accordance with the present invention.

FIG. 4 is a diagram showing a configuration of the content code table 305.

The content code table 305 comprises lines 3051, 3052, . . . which correspond to the application programs to be executed in its own processor.

Each of the lines 3051, 3052, . . . generally comprises a CC information area 30511 for holding information relating to input/output data of the application program for that line, and an AP information area 30512 for holding information relating to the corresponding application program.

The CC information area 3051 comprises an ICC field 30511a for storing the content code of the input data of the application program for that line, and an OCC field 30511b for storing the content code of the output data of that application program. The AP information area 30512 comprises a name field 30512a for storing the name of the application program for that line, and an ATR field 30512b for storing the attribute of that application program.

Figure 5:
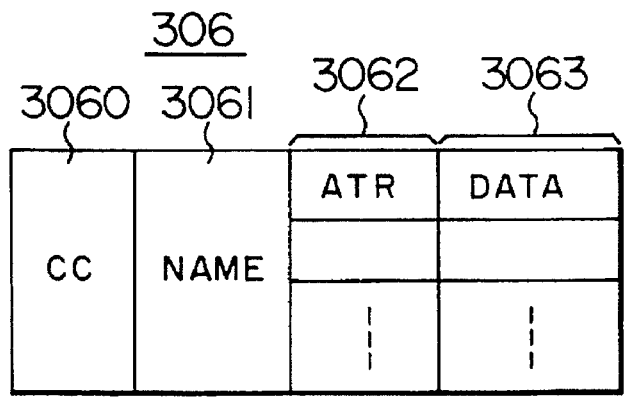
FIG. 5 is a diagram which shows a configuration of a message discrimination buffer in accordance with the present invention.

FIG. 5 is a diagram which shows a configuration of the message discrimination buffer 306.

The message discrimination buffer 306 comprises a CC filed 3060 for storing the content code held in the CC field 201 for the received message, a name field 3061 for storing the name of the application program held in the name field 203 for the received message, an ATR field 3062 for storing the attribute held in the ATR filed 204 for the received message, and a data field 3063 for storing the data held in the data field 205 for the received message. To comply with a plurality of programs of multiple versions, a plurality of ATR fields 3062 and a plurality of data fields 3063 are assigned to each of the CC field 3060 and the name field 3061.

Figure 6:
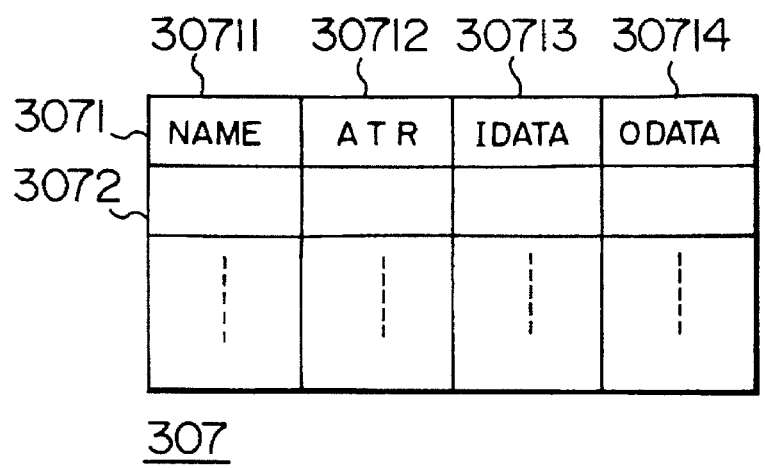
FIG. 6 is a diagram which shows a configuration of an AP input/output data area in accordance with the present invention.

FIG. 6 is a diagram which shows a configuration of the AP input/output data area 307.

The AP input/output data area 307 comprises lines 3071, 3072, . . . corresponding to the application programs to be executed in its own processor.

Each line comprises a name field 30711 for storing the name of the application program for that line, An ATR field 30712 for storing the attribute of the application program, an i data field 30713 for storing the input data to the application program, and an o data field for storing the output data from the application program.

A flow of the process in the reception of the message in each of the processors 11–14 is now explained.

Figure 7:
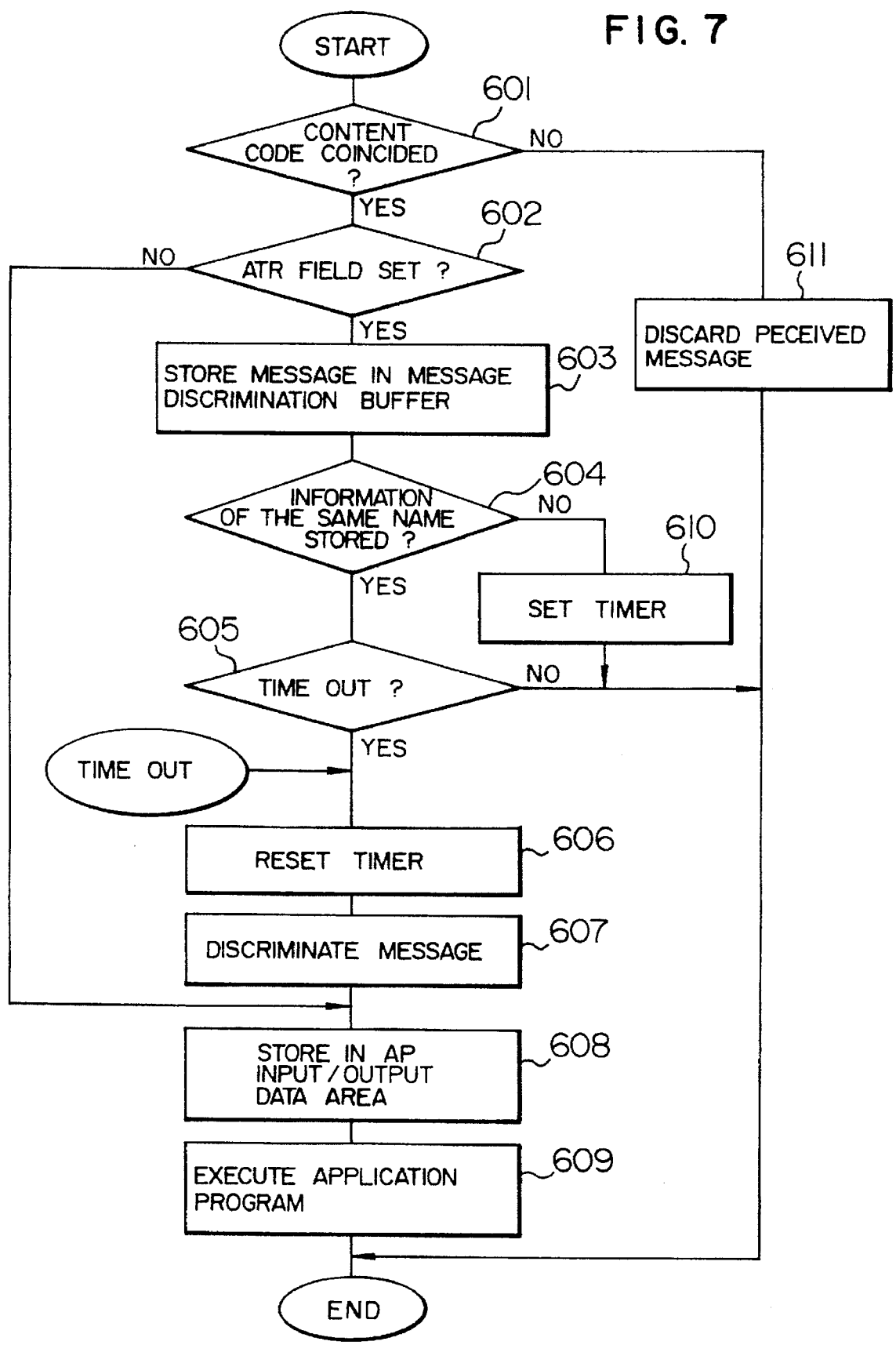
FIG. 7 is a flow chart showing a flow of a process in receiving messages to be executed by the processors in accordance with the present invention.

FIG. 7 is a flow chart showing a flow of the process executed by the processing unit 302 in each of the processors 11–14 in response to reception of the message. When the processing unit 302 of each of the processors 11–14 receives the message from the network 1 by the interface 301, it stores the message in the receive buffer 303 and checks whether or not the content code coinciding to the content code stored in the CC field 201 of the message stored in the receive buffer 303 has been registered in the ICC field 30511a of the content code table 305 (step 601). If there is no coinciding content code, the content of the receive buffer 303 is erased (step 611) and the message reception process is terminated. If there is a content code in the content code table 305 which coincides to the content code of the message stored in the receive buffer 303, it checks whether or not the attribute of the application program which sent the message has been set in the ATR field 204 of the message stored in the receive buffer 303 (step 602). If the attribute is not set in the ATR field 204 (the ATR field is "Null"), the process proceeds to a step 608. If the attribute is set in the ATR field, the message is stored in the message discrimination buffer 306 to discriminate it from the outputs of the application programs of other versions (step 603). Specifically, the content code of the message is stored in the CC field 3060 of the message discrimination buffer 306, the program name is stored in the name field 3061, the attribute is stored in the ATR field 3062 and the data is stored in the data field 3063. Then, it checks whether or not the message received from the application program of the same program name but different attribute has been stored in the message discrimination buffer 306 (step 604). If the message from other application program of different attribute has not been stored, a timer is set (step 610) to wait for the message from other application program of different attribute for a predetermined time, and then the reception process is terminated. If the message from other application program of different attribute has already been stored in the message discrimination buffer in the step 604, whether or not the timer previously set has been timed out (step 605). If it has not been timed out, the reception process is terminated to wait for the reception of other message. The time-out period is set to be slightly longer than difference between a processing time for the shortest process and a processing time for the longest process of the application programs so that the messages from all application programs for the same process can be received. If there is difference between the transmission delays of the messages over the network 1, it is taken into account.

When the timer-set in the step 610 times out, or when the time-out is detected in the step 605, the timer is reset (step 606). Then, for the message stored in the message discrimination buffer 306, which message is to be used to execute the application program is determined (step 607). In the step 607, if there is only one message stored in the message discrimination buffer 306, the stored message is selected as the message to be stored in the AP input/output data area 307. If there are a plurality of messages stored in the message discrimination buffer 306, the contents of the ATR fields 3062 and the data fields 3063 are compared and one of them is selected by an appropriate message selection logic and it is selected as the message to be stored in the AP input/output data area 307. Detail of the message selection logic will be described later.

In a step 608, the message selected in the step 607 (or the message in the receive buffer 303 if the process jumped from the step 602 to the step 608) is stored in the AP input/output data area 307. In this case, the content code table 305 is referred and the program name and the attribute of the application program using the message are determined based on the name field 30512a and the ATR field 30512b corresponding to the ICC field 30511a storing the same content code as that of the CC field 201 of the received message. The data stored in the data field 3060 of the message discrimination buffer 306 (or the data stored in the data field of the message in the receive buffer 303 when the process jumped from the step 602 to the step 608) is stored in the i data field 30713 corresponding to the name field 30711 and the ATR field 30712 of the AP input/output data area 307 having those program name and attribute. Further, the message discrimination buffer 306 is cleared.

After the message has been stored in the i data field 30713 of the AP input/output data area 307, the application program for that line is executed (step 609).

In the execution of the application program, if there is data to be transmitted to other application programs, the data is stored in the o data field 30714 of the line corresponding to the AP input/output data area 307. The processing unit 302 adds the CC field 201, the name field 203 and the ATR field 204 to the execution result data stored in the o data field 30714 to generate a message, and stores the message in the transmit buffer 304. The message stored in the transmit buffer 304 is sent out to the network 1 through the appropriate interface 301 and transmitted to other processors.

The message selection logic used in selecting one message from the plurality of messages in the step 607 is now explained. In the present embodiment, as an example of the message selection, where the application program generating the message is to perform the same simulation with different precisions from version to version, the validity of the result of the high precision simulation is checked by the result of the low precision simulation and an appropriate message is selected.

First, based on the content of the ATR field 3062 of the message discrimination buffer 306, the data "X" being the execution result of the application program (program A) performing the low precision simulation and the data "Y" being the execution result of the application program (program B) performing the high precision simulation are recognized. The validity of the simulation result of the program B (high precision simulation result) is checked based on the simulation result of the program A (low precision simulation result) in accordance with the following formula (1) in which "d" is a predetermined permissible value.

$$X-d<Y<X+d \quad (1)$$

If the formula (1) is met, it is determined that the simulation result by the program B is valid and the message from the program B is selected as the message to be used for the execution of the application program. If the formula (1) is not met, it is determined that the simulation result by the program B is not valid. Then, the message from the program A is selected as the message to be used for the execution of the application program. Other discrimination formula than the formula (1), for example, $X<Y<X+d$ or $X<Y$ may be used depending on the application program.

In the present embodiment, the validity of the execution result of the application program having a complex logic which is of high precision but easily includes bugs is checked by using the execution result of the application program having a simple logic which is of low precision but hard to include bugs. Accordingly, it is not necessary for the user to prepare the acceptance test as it is in the prior art. Further, since the standard for the check is determined by the input data and not fixed unlike the acceptance test, the appropriate execution result can be selected by the input data. In parallel to the application program of a new version, the application program of an old version may also be run and the validity of the execution result of the application program of the new version may be checked by the execution result of the application program of the old version by using the selection logic.

In the method of the present embodiment, the selection of the messages transmitted from the two application programs of different versions has been explained. Where three or more programs of different versions are parallelly executed, the attributes of the programs of the respective versions are prioritized in the order of the calculation precision, and the validity of the content of the data field 3063 of the message having the ATR field 3062 having the i-th priority attribute stored therein, of the messages in the message discrimination buffer 306 is checked by the content of the data field 3063 of the message having the ATR field 3062 having the (i+1)th priority attribute stored therein, and the above process is repeated while i is incremented from 1, and the message having the i-th priority ATR field when the check is first OKed is selected.

Figure 8:
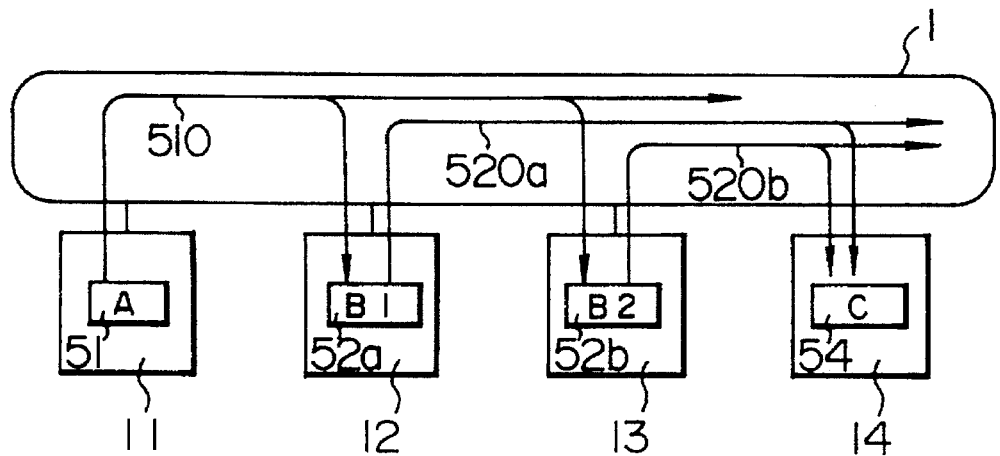
FIG. 8 is a diagram which shows a data flow chart showing delivery of messages among the processors in accordance with the present invention.

FIG. 8 is a diagram which shows a flow chart of the messages when the application programs 51, 52a, 52b and 54 are executed by the processors 11, 12, 13 and 14.

In FIG. 8, the processor 11 executes the application program 51 and transmits the execution result to the CC field 201 as the message having "CCbi". The name of the application program 51 is "A" and there is no other version of the program which performs the same function. Thus, the attribute is "Null". The processors 12 and 13 receive the message having "CCbi" set in the CC field 201 and execute the application programs 52a and 52b, and sends the execution results to the CC field 201 as the messages having "CCbo". The application programs 52a and 52b are programs of different versions which perform the same simulation by using the execution result outputted from the application program 51, and have the same name and different attributes. More specifically, the application program 52a has a complex logic, performs high precision simulation, takes a long calculation time and easily includes a program error. On the other hand, the application program 52b has a simple logic, performs low precision simulation, takes short calculation time and is hard to include the program error. The name of the application program 52a is "B" and the attribute is "1", and the name of the application program 52b is "B" and the attribute is "2". The processor 14 receives the messages including the simulation results of the application programs 52a and 52b sent from the processors 12 and 13 and selects one of them by the selection logic to execute the application program 54. The name of the application program 54 is "C" and the attribute is "Null" because there is no other version of the program which performs the same function.

In order to conduct the above process, the line of the content code table 305 of the processor 12 corresponding to the application program 52a has "CCbi" set in the ICC field 30511a, "CCbo" set in the OCC field 30511b, "B" set in the name field 30512a, and "1" set in the ATR field 30512b. Similarly, the line of the content code table 305 of the processor 13 corresponding to the application program 52b has "CCbi" set in the ICC field, "CCbo" set in the OCC field 30511b, "B" set in the name field 30512a and "2" set in th ATR field 30512b. The line of the content code table 305 of the processor 14 corresponding to the application program 54 has "CCbo" set in the ICC field 30511a and "C" set in the name field 30512a.

First, the processor 11 executes the application program 51 and sends the execution result message 510 to the network 1. When it is recognized that the CC field 201 of the message 510 contains "CCbi", the processors 12 and 13 receive the message 510. Since "Null" is contained in the ATR field 204 of the message 510, the processors 12 and 13, when they receive the message 510, execute the application programs 52a and 52b, respectively, without waiting for other message. They send the execution results 520a and 520b to the network 1, respectively.

The messages 520a and 520b are as follows:
(1) Message 520a
CC field: CCbo, Name field: B, ATR field: 1
Data field: simulation result by the program 52a
(2) Message 520b
CC field: CCbo, Name field: B, ATR field: 2
Data field: simulation result by the program 52b It is assumed that the messages 520a and 520b are received by the processor 14 in this sequence. When the processor 14 first receives the message 520a, it recognizes that the ATR field 204 is not "Null" and there is a different version of a program, and stores the message in the message discrimination buffer 306. In the message discrimination buffer 306, the CC field 3060 is "CCbo", the name field 3061 is "B", the ATR field 3062 is "1" and the data field 3063 holds the "simulation result by the program 52a". Thereafter, the processor 14 sets the timer to wait for the reception of the message 52b and the receive process is terminated.

When the processor 14 receives the message 520b, it stores the message 520b to the message discrimination buffer 306, but since the same contents have been stored in the CC field and the name field, "2" is stored in the ATR field of that area and "simulation result by the program B2" is stored in the data field. When the timer times out, one of the messages 520a and 520b is selected by the selection logic and it is stored in the AP input/output data area 307 and the message discrimination buffer 306 is cleared. Then, the line of the content code table which has the same ICC field 30511a as the CC field 3060 of the message stored in the AP input/output data area 307 is checked, and the application program registered in the information area 30512 of that line is executed. Since "C" has been registered as the name of program, the application program 54 is executed.

In this manner, the processor 14 selects one of the outputs of the execution results of the programs of different versions and executes the application program C based thereon.

Figure 9:
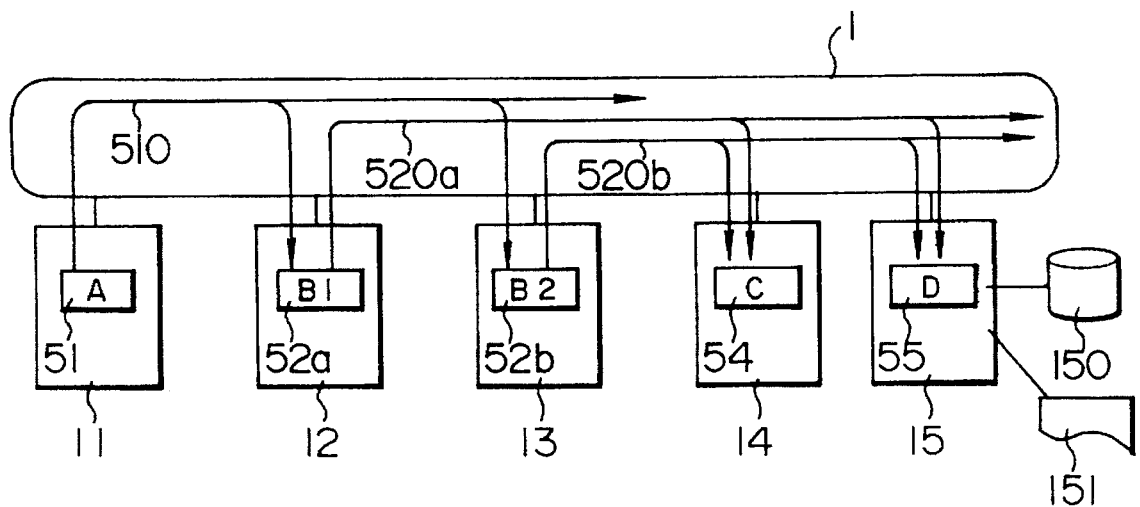
FIG. 9 is a data flow chart showing another example of delivery of messages among the processors in accordance with the present invention.

In such a system, of the messages 520a and 520b used by other processors, the message used by the application programs 54 may be recorded, as shown in FIG. 9, a processor 15 has an application program 55. A disk drive 150 and a printer 151 are connected to the processor 15. Other portions of FIG. 9 are identical to those described above and the explanation thereof is omitted.

The processor 15 receives the messages 520a and 520b from the network 1, as the processor 14 does, and selects one of the messages by using the same message selection logic as that used by processor 14. The application program 55 is executed by using the selected message. The application program 55 stores the selected message in the disk drive 150 and prints the message out by the printer 151.

By using the information stored in the disk drive 150 or the output of the printer 151, it is possible to determine whether the application program executing the high precision operation runs normally or not while the system makes the on-line operation. In a similar manner, when the run of the program of a new version is to be started, the program of the new version and the program of the old version are multiple-executed to install the program of the new version without stopping the operation and check the operation in the on-line state.

In the present embodiment, the validity of the execution result of the application program of the high precision is checked by using the execution result of the application program having a simple algorithm and small program error but low precision, so that the message is selected to be used for the execution of its own program. In the case where the validity of the execution result of the program has been fully proved, the validity check may not be conducted and the message of the received messages indicative of the high precision by the attribute may be selected. In the case where the time from the reception of the first message to the execution of the program is limited, time at the time-out may be set within the permitted time period and the message of the messages received during that period exhibiting the highest precision execution result may be selected. In this manner, the execution result by the high precision application program can be most effectively used without losing the real time property.

In the embodiments described above, one of the application programs of different versions is selected. Alternatively, all of the execution results may be used. This method is now explained with reference to FIG. 10.

Figure 10:
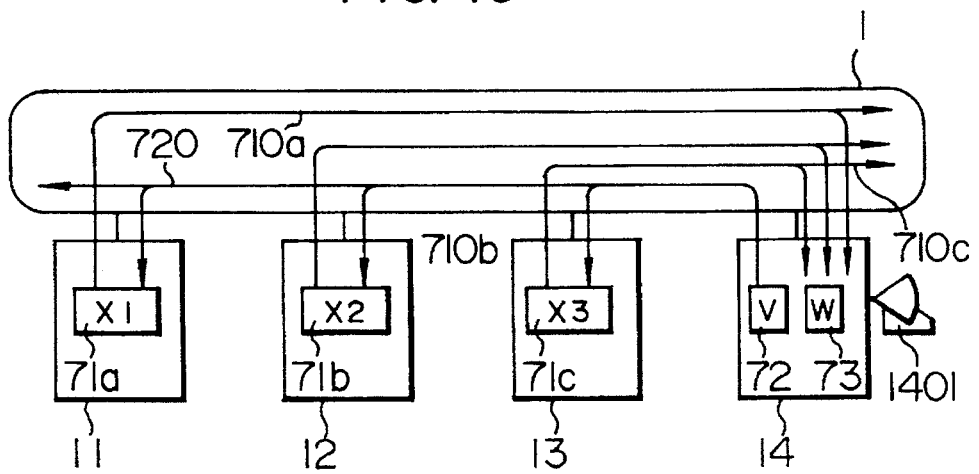
FIG. 10 is a flow chart showing a flow of a example of delivery of messages among the processors in accordance with the present invention.

In FIG. 10, application programs 71a, 71b and 71c of different versions are arranged in the processors 11, 12 and 13, respectively. The application programs 71a, 71b and 71c are those of different versions which perform the same function, and the names thereof are "X" and the attributes are "1", "2" and "3", respectively. The application program 71a performs a simulation at a high precision based on a complex logic and has a long calculation time. On the other hand, the application program 71c performs a simulation at a low precision based on a simple logic and a calculation time thereof is short. The precision and the calculation time of the application program 71b are in between those of the application program 71a and the application program 71c.

Application programs 72 and 73 are arranged on the processor 14 and a terminal 1401 is connected to the processor 14 as interface means with a user. The application program 72 requests the simulation based on a request inputted from the terminal 1401. The application program 73 receives the result of the simulation to output it to the terminal 1401.

When the processor 14 receives the request from the terminal 1401, it executes the processing by the application program 72 and outputs a message 720 requesting the simulation to the network 1. When the processors 11, 12 and 13 receives the message 720, they start the execution of the application programs 71a, 71b and 71c, respectively. The execution result of the application program 71c is first outputted to the network 1 as a message 710c. Thereafter, the execution result of the application program 71b is outputted to the network 1 as a message 710b, and the execution result of the application program 71a is finally outputted to the network as a message 710a. The processor 14 receives the messages 710c, 710b and 710a in this sequence and executes the processing by the application program 73 each time, it receives the application program and displays the content of the received message on the terminal 1401.

In this manner, the result of the low precision simulation is first displayed on the terminal 1401, and then the result of the middle precision simulation is displayed. Finally, the result of the high precision simulation is displayed. Thus, the user can previously acquire a general result before he/she acquires the result of the high precision simulation. Since the user can grasp the relation between the results of gradually increasing precision, the user interface is improved. For example, assuming that the application programs 71a, 71b and 71c are image analysis programs of different analysis precisions, a coarse image is displayed on the terminal 1401 shortly after the request for process, and the image of higher precision are displayed as the time elapses.

While specific embodiments of the present invention have been explained, it should be understood that various forms may be taken without departing from the spirit of the present invention. For example, the messages from the programs of different versions may be used by a plurality of programs which process in different manners. In this case, the message to be used by each program may be selected with the same criterion (of different message selection logics)or it may be selected by different criteria for each program. In a client/server type system, a request for process from a client may be processed by a plurality of programs (servers) of different versions and the process results by the programs of different versions may be used by the client as required.

In accordance with the program execution method and the processing system of the present invention, the programs which perform the same function but have different execution logics or execution precisions are executed in parallel, and one of the execution results is selected based on the versions of the programs, the contents of the execution results and the output times. Accordingly, the user is not required to prepare the acceptance test as he/she was in the prior art, and the burden to the user is reduced. Further, the independence among the programs is maintained and the message which is nit finally used in the execution of the program may be effectively used. The selection of the messages from the programs of different versions is not fixed as it is in the acceptance test and the appropriate execution result for the input data can be selected by the selection at the criterion determined by the input data so that the fine compliance to the user request is attained and the user interface is improved.

What is claimed is:

1. A program execution method in a distributed processing system having a plurality of processors connected through a network, comprising the steps of:

executing multiple-version programs in at least two first processors;

transmitting messages from said first processors to said network, each of said messages including data representing execution results output from said programs and attribute information indicating a version of the multiple-version programs;

receiving in a second processor the messages transmitted from said first processors;

selecting, within said second processor, one of the received messages based on the attribute information contained in the received messages; and executing a program, other than one of said multiple-version programs, in said second processor by using the data contained in the selected message.

2. A program execution method according to claim 1, wherein said message-selecting step includes the step of selecting, from the messages transmitted from said first processors, those messages which are received within a predetermined permitted time period and identifying those messages as candidate messages to be considered for selection in said message-selecting step.

3. A program execution method according to claim 2, wherein said message-selecting step includes the steps of:

discriminating, from said candidate messages, that message which has been transmitted by a particular one of said multiple-version programs having the highest priority; and selecting said one of the received messages in accordance with a result obtained in said discriminating step.

4. A program execution method according to claim 1, wherein said step of executing the multiple-version programs in said first processors includes the step of executing programs of different calculation precisions.

5. A program executing method according to claim 1, wherein said step of executing multiple-version programs in said first processors includes the step of executing programs developed in different time frames.

6. A program execution method in a distributed processing system having a plurality of processors connected through a network, comprising the steps of:

executing multiple-version programs in at least two first processors;

transmitting messages from said first processors to said network, each of said messages including data representing execution results output from said multiple-version programs and attribute information indicating functions to be performed by said multiple-version programs;

receiving in a second processor the messages transmitted from said first processors;

selecting, within said second processor, one of the received messages based on the attribute information and data contained in the received messages; and executing a program, other than one of said multiple-version programs, in said second processor by using the data contained in the selected message.

7. A program execution method according to claim 6, wherein said message-selecting step includes the steps of:

recognizing a priority of each of said multiple-version programs based on the attribute information;

determining whether or not the data contained in each of said messages is valid based on the priority of each of said multiple-version programs; and selecting that message transmitted from the program having the highest priority.

8. A computer system comprising:

a transmission line for transmitting messages;

a plurality of first processors, connected to said transmission line, for executing multiple-version programs each performing a same function, each of said first processor including:

program execution means for executing a respective one of said programs, message preparation means for preparing a message containing data derived from the execution of said respective one of said programs and attribute information indicating which of said programs generated said data, and first interface means for sending the message prepared by said message preparation means to said transmission line; and a second processor connected to said transmission line and including:

second interface means for receiving messages prepared and sent from said first processor along said transmission line, message decoding means for extracting the data and attribute information contained in each of the messages received by said interface, selection means for selecting data contained in one of said messages based on the data and attribute information contained in each of said messages, and program execution means for executing a program, other than one of said multiple-version programs, by using the data selected by said selection means.

9. A program execution method in a distributed processing system having a plurality of processors connected through a network, comprising the steps of:

executing, in at least two first processors, different precision programs, each of which performs a same function;

transmitting messages from said first processors to said network, each of said messages containing data representing results obtained from execution of each of said different programs and attribute information indicating a precision for each of said programs;

receiving in a second processor the messages transmitted from each of said first processors;

displaying the messages, as received, on a display means; and replacing the displayed messages on said display means when said second processor receives messages executed by a program having a precision higher than the precisions of programs corresponding to other ones of said messages, said displayed messages being replaced with the message which corresponds to the higher precision program.

10. A program execution method according to claim 9, wherein said different precision programs include programs having different precisions in calculation.

11. A program execution method according to claim 10, wherein said different precision programs are programs for executing graphic image analysis, and the messages transmitted from said first processors each include a graphic image which is analyzed in said graphic image analysis.

* * * * *

UNITED STATES PATENT AND TRADEMARK OFFICE
CERTIFICATE OF CORRECTION

PATENT NO. : 5,630,135
DATED : May 13, 1997
INVENTOR(S) : Masayuki Orimo, Kinji Mori, Katsumi Kawano, Shigeki Hirasawa
Hiroshi Fujise, Hitoshi Suzuki and Tomoaki Nakamura It is certified that error appears in the above-indentified patent and that said Letters Patent is hereby corrected as shown below:

On the Title Page, left-hand column,
after "[22] Filed: Jun 3, 1994"
insert:

-- [30] Foreign Application Priority Data
June 4, 1993 [JP] Japan ... 05-134945--

Signed and Sealed this

Eighth Day of August, 2000

Attest:

Q. TODD DICKINSON

Attesting Officer

Director of Patents and Trademarks